US012729094B2

(12) United States Patent
Jeong et al.

(10) Patent No.: US 12,729,094 B2
(45) Date of Patent: Sep. 8, 2026

(54) METHOD AND APPARATUS FOR CONTROLLING AN ELEVATOR CAR

(71) Applicants: HYUNDAI MOTOR COMPANY, Seoul (KR); KIA CORPORATION, Seoul (KR); KOOKMIN UNIVERSITY INDUSTRY ACADEMY COOPERATION FOUNDATION, Seoul (KR)

(72) Inventors: Gu Min Jeong, Seoul (KR); Hyun Jung Oh, Seoul (KR); Seung Hyeon Lee, Seoul (KR); Yo Cheol Jang, Suwon-si (KR); Ju Young Oh, Seoul (KR); Jae Jun Ha, Hwaseong-si (KR)

(73) Assignees: HYUNDAI MOTOR COMPANY, Seoul (KR); KIA CORPORATION, Seoul (KR); KOOKMIN UNIVERSITY INDUSTRY ACADEMY COOPERATION FOUNDATION, Seoul (KR)

( * ) Notice: Subject to any disclaimer, the term of this patent is extended or adjusted under 35 U.S.C. 154(b) by 1366 days.

(21) Appl. No.: 17/500,732

(22) Filed: Oct. 13, 2021

(65) Prior Publication Data

US 2022/0402724 A1 Dec. 22, 2022

(30) Foreign Application Priority Data

Jun. 21, 2021 (KR) ........................ 10-2021-0080014

(51) Int. Cl.
*B66B 1/24* (2006.01)
*B66B 1/34* (2006.01)
(Continued)

(52) U.S. Cl.
CPC .......... *B66B 1/2408* (2013.01); *B66B 1/3461* (2013.01); *B66B 1/3476* (2013.01);
(Continued)

(58) Field of Classification Search
CPC ... B66B 1/2408; B66B 1/3461; B66B 1/3476; B66B 1/468; B66B 5/0012;
(Continued)

(56) References Cited

U.S. PATENT DOCUMENTS 8,958,910 B2 * 2/2015 Ichinose ............... B66B 1/2458 700/258
11,261,053 B2 3/2022 Vuorenala et al.
(Continued)

FOREIGN PATENT DOCUMENTS

CN 110790097 A 2/2020
CN 111377311 A * 7/2020 ........... B66B 1/3492
CN 112390099 A * 2/2021 ........... B66B 1/3415

OTHER PUBLICATIONS

Office Action cited in the corresponding Korean patent application No. 10-2021-0080014; Jul. 23, 2026; 14 pp.

*Primary Examiner* — Bickey Dhakal
(74) *Attorney, Agent, or Firm* — Lempia Summerfield Katz LLC

(57) ABSTRACT

An elevator control method is implemented by a computer and comprises: receiving a board request from a board-standby robot; determining a priority of the board-standby robot based on information relating to the board-standby robot and operation information of the elevator; and controlling operation of an elevator car based on the priority of board-standby robots and the priority of on-board robots within the elevator car.

22 Claims, 10 Drawing Sheets

(51) Int. Cl.
*B66B 1/46* (2006.01)
*B66B 5/00* (2006.01)
*G05D 1/00* (2024.01)

(52) U.S. Cl.
CPC ............ *B66B 1/468* (2013.01); *B66B 5/0012* (2013.01); *G05D 1/0297* (2013.01); *B66B 2201/103* (2013.01); *B66B 2201/21* (2013.01); *B66B 2201/211* (2013.01); *B66B 2201/23* (2013.01); *B66B 2201/233* (2013.01); *B66B 2201/4615* (2013.01); *B66B 2201/4653* (2013.01); *B66B 2201/4661* (2013.01)

(58) Field of Classification Search
CPC .......... B66B 2201/103; B66B 2201/21; B66B 2201/211; B66B 2201/23; B66B 2201/233; B66B 2201/4615; B66B 2201/4653; B66B 2201/4661; B66B 2201/104; B66B 2201/222; B66B 1/2416; B66B 2201/20; G05D 1/0297; G05D 1/0291; G06Q 10/0631; Y02B 50/00
See application file for complete search history.

(56) References Cited

U.S. PATENT DOCUMENTS

| | | | | |
|---|---|---|---|---|
| 2018/0250825 | A1* | 9/2018 | Hashimoto .............. | B25J 18/00 |
| 2019/0315592 | A1 | 10/2019 | Machida et al. | |
| 2020/0039754 | A1 | 2/2020 | Vuorenala et al. | |
| 2021/0122607 | A1* | 4/2021 | Zhang ................... | B66B 1/3461 |
| 2021/0284485 | A1* | 9/2021 | Nichols ................... | B66B 1/468 |

* cited by examiner

METHOD AND APPARATUS FOR CONTROLLING AN ELEVATOR CAR

CROSS-REFERENCE TO RELATED APPLICATIONS

This application is based on and claims priority to Korean Patent Application Number 10-2021-0080014, filed Jun. 21, 2021, the disclosure of which is incorporated by reference herein in its entirety.

TECHNICAL FIELD

The present disclosure relates to a method and an apparatus for controlling an elevator and relates to an elevator control method and apparatus for determining a priority of robots, which use the elevator, and controlling operation of the elevator according to the priority of robots.

BACKGROUND

The content described in this section merely provides background information for the present disclosure and does not constitute prior art.

Various types of buildings that are built for residential and business uses and the like are provided with elevators to facilitate movement in the vertical direction.

In recent years, studies have been actively conducted on robots in buildings, such as transporting people or freight in a building or guiding a person.

In order for robots to provide such services in buildings, robots should use elevators.

However, research and development have not been done enough on techniques, which enable robots to efficiently move to another floor by using an elevator. Therefore, the number of unnecessary and inefficient stops in elevator operations increases, which in turn leads to the increase in stand-by time for board-standby robots.

Therefore, there has been a need for an optimized elevator operation scheduling upon taking into account get-on and get-off of the robots when robots move to different floors using elevators. Furthermore, there has been a need for a method for controlling movements of robots within the range required for such optimized elevator operation scheduling.

SUMMARY

It is an object of some embodiments of the present disclosure to provide an elevator control method and apparatus for determining a priority for board-standby robots and on-board robots and for controlling elevator operation according to the priority, to reduce the standby time for the robots to reach a destination floor and to improve an overall operation efficiency of elevators.

It is an object of some embodiments of the present disclosure to provide a method and apparatus for controlling an elevator to improve efficiency of a transportation and to facilitate safety by determining priority of robots in consideration of a freight loaded in the robots.

It is an object of some embodiments of the present disclosure to provide a method and apparatus for controlling an elevator to determine priority of robots in consideration of the overall time of a board-standby time and an exit-standby time of robots, so that robots with a low initial priority also get on and off with higher priority over time than other robots. Thus, excessive board and exit delay may be prevented.

It is an object of some embodiments of the present disclosure to provide a method and apparatus for controlling an elevator to control movement of robots according to priority of robots. Thus, congestion may be reduced and operation efficiency of an elevator may be improved.

According to at least one embodiment, an elevator control method, which is implemented by a computer, comprises: receiving a board request from a board-standby robot; determining a priority of the board-standby robot based on information relating to the board-standby robot and operation information of the elevator; and controlling operation of an elevator car based on the priority of board-standby robots and the priority of on-board robots within the elevator car.

According to another embodiment, an elevator control device comprises: a communication unit for receiving a board request from a board-standby robot; a priority determination unit for determining a priority of the board-standby robot on the basis of information relating to the board-standby robot and operation information of an elevator; and a control unit for controlling operation of the elevator on the basis of the priority of the board-standby robot and the priority of on-board robots.

DETAILED DESCRIPTION

Figure 1:
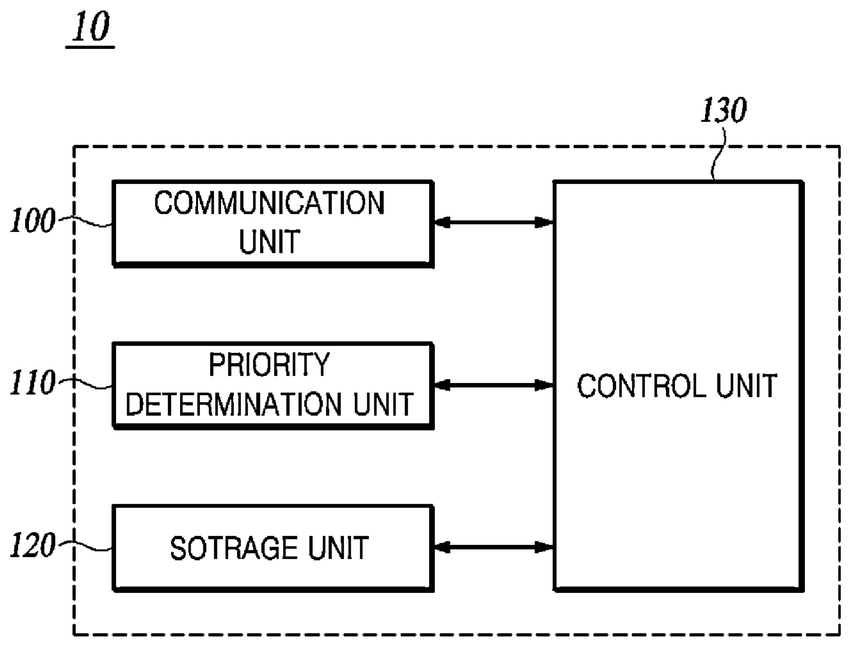
FIG. 1 is a configuration diagram of an elevator control device in accordance with an embodiment of the present disclosure.

Some embodiments of the present disclosure are now described in detail with reference to the illustrative drawings. It should be noted that, in adding reference numerals to components in each figure, the same or equivalent components should have the same numerals as possible, even if they are shown on different figures. In the description of the present disclosure, a detailed description of a related known configuration or function is omitted when it is determined that the gist of the disclosure can be solved.

In the description of the structural elements of the present disclosure, the terms first, second, A, B, (a), (b), and the like can be used. These terms are only intended to distinguish the elements from other elements, and the nature, order, or the like of the elements is not limited by the terms. Throughout the specification, when a part is referred to as "including" or "having" a certain component, it means that the part may further include other components rather than excluding other components unless otherwise specified. Also, the terms 'unit', 'module,' and the like described in the specification mean a unit for processing at least one function or operation, which may be implemented in hardware or software or a combination of hardware and software. When a component, device, element, or the like of the present disclosure is described as having a purpose or performing an operation, function, or the like, the component, device, or element should be considered herein as being "configured to" meet that purpose or to perform that operation or function. The present disclosure describes various components of an elevator control device as units, such as: a communication unit; a priority determination unit; a storage unit; and a control unit. Each of these units may separately embody or be included with a processor and a memory, such as a non-transitory computer readable media, as part of the apparatus.

In the following, robots refer to all moving freights that can move autonomously. Robot may be implemented as a personal mobility vehicle. Examples of them may include micro mobility, electric bicycle, electric kickboard, electric scooter, electric wheelchair, electric bike, Segway, 2-Wheel Drive, Smart Car, 1-2th power shuttle, personal mobile means, personal flight means, smart mobility, shared mobility, First Mile, Last Mile, Purpose Built Vehicle (PBV), Personal Air Vehicle (PAV), electric car, etc.

FIG. 1 is a configuration diagram of an elevator control device in accordance with an embodiment of the present disclosure.

Referring to FIG. 1, the elevator control device 10 (hereinafter referred to as "control device") includes a communications unit 100, a priority determination unit 110, and a control unit 130. The control device 10 may further include a storage unit 120 and an image collection unit (not shown).

The communications unit 100 is a network interface that connects various devices and units to an in-building network and is a component that performs communications with an on-board robot.

The communications unit 100 can receive the board request from the board-standby robot or receive the destination floor change request from an on-board robot in the elevator. Further, the communications unit 100 can send an exit command to an on-board robot by the control unit 130.

The communications unit 100 can receive information on the current position of a board-standby robot, a target floor, a standby time, and a type of the freight loaded by the board-standby robot from the board-standby robot. In addition, the communications unit 100 can receive information on the exit-wait time from the on-board robot.

The communications unit 100 may include one or more components that enable communications with an external device. For example, the communications unit 100 may include various wireless communication modules such as a Bluetooth module, a Radio Frequency Identification (RFID) communication module, an Ultra-Wide Band (UWB), a Wireless Local Access Network (WLAN) communication module, an NFC communication module and a BLE communication module.

The priority determination unit 110 determines the priority of the board-standby robot based on information on the board-standby robot and operation information of the elevator. Here, the operation information of the elevator includes at least one of a current position of the elevator, a departure floor, or a destination floor.

In accordance with an embodiment of the present disclosure, the priority determination unit 110 determines the priority of the board-standby robot based on the destination floor of the board-standby robot and the destination floor of the elevator. The priority determination unit 110 can set the priority of the board-standby robot to be high when the destination floor of the board-standby robot and the destination floors of the elevator coincide with each other. The priority determination unit 110 can set the priority of the board-standby robot to be low when the destination of the board stand-by robot does not match the destination floors of the elevator car. After the elevator arrives at the destination floor of the elevator, the probability that the board-standby robot waiting on the same floor can board the elevator increases. The control device 10 can reduce the time for the board-standby robot to reach the destination floor. In addition to this, the priority determination unit 110 may set the priority higher as the difference between the destination floor of the on-board standby robot and that of the elevator becomes smaller.

In accordance with an embodiment of the present disclosure, the priority determination unit 110 determines the priority of the boarding robot on the basis of the type of the freight loaded on the boarding robot when the on-board robot is loaded with freight. For example, the priority determination unit 110 can set the priority of the board-standby robot to be high when the board-standby robot is loaded with food. The priority according to the type of the freight may be preset by the supervisor. The control device 10 can improve the quality of service provided for users in a building.

In accordance with an embodiment of the present disclosure, the priority determination unit 110 determines the priority of the board-standby robot based on the standby time of the board-standby robot. The priority determination unit 110 may set the priority of the board-standby robot to be higher as the standby time of the board-standby robot becomes longer. Even if the priority is low at the time of an initial board request of the board-standby robot, the control device 10 can change the priority to be higher over time and thus excessive boarding delay of the board-standby robot may be prevented.

The priority determination unit 110 may determine the priority of the board-standby robot further based on information on the on-board robots.

In accordance with an embodiment of the present disclosure, when a board-standby robot and at least one on-board robot are loaded with a freight, the priority determination unit 110 determines the priority of the board-standby robot based on the freight information of the at least two such robots. For example, in a case where the board-standby robot is loaded with a fire machine and the on-board robot is carrying a flammable material, the priority determination unit 110 sets the priority of the board-standby robot to be low. By doing this, the control device 10 can further facilitate the safety of buildings including robots and elevators.

In accordance with an embodiment of the present disclosure, the priority determination unit 110 determines the priority of the on-board robots among the on-board robots based on the number of exit-standby robots whose target floor is a floor on which the on-board robots exist. The priority determination unit 110 may set the priority of the board-standby robot to be higher as the number of exit-standby robots whose target floor is a floor on which the on-board robots exist is larger. The control device 10 can reduce the time for exit-standby robots in the elevator to reach the destination floor to thereby improve the operation efficiency of the elevator.

In accordance with an embodiment of the present disclosure, the priority determination unit 110 determines the priority of the board-standby robot on the basis of whether or not a user is riding on the on-board robots and whether or not a user is riding on the board-standby robots. Herein, the board-standby robots and the on-board robots are robots that a user can ride on. Herein, the user refers to a human who drives or operates a robot. When an on-board robot does not carry a user and a board-standby robot carries a user, the priority determination unit 110 may set the priority of the board-standby robots to be high.

The priority determination unit 110 may adjust the priority of the on-board robots that are riding on the elevator.

In accordance with an embodiment of the present disclosure, the priority determination unit 110 adjusts the priority of the board-finished robots based on the exit-standby time of the board-finished robots in the elevator. Herein, the board-finished robots refer to on-board robots that are on board an elevator when a board-standby robot has not yet boarded the elevator and refer to both board-standby robots and on-board robots when the board-standby robots finish boarding the elevator. The priority determination unit 110 may set the priority of the board-finished robots higher as the exit-standby time becomes longer. Even if the priority of the board-finished robots is low at the time of boarding, the control device 10 can prevent excessive wait of the exit-standby robots by arranging, over time, the robots having long exit-standby time so as to have higher priority for exit.

In accordance with an embodiment of the present disclosure, when a destination floor change request is received from one of the board-finished robots staying in the elevator, the priority determination unit 110 adjusts the priority of the board-finished robots according to the destination floor change request. When the user who has requested service to an on-board robot changes the destination floor by using his/her communications terminal or the like, the priority determination unit 110 adjusts the priority of the board-finished robots. Therefore, the control device 10 can provide convenience to users by reflecting the change of the destination floor of the board-finished robots during the elevator operation.

In accordance with another embodiment of the present disclosure, the priority determination unit 110 may determine the priority based on one of the multiple pieces of information used for determining the priority or may determine the priority by combining such multiple pieces of information. Herein, when multiple pieces of information are combined, the priority determination unit 110 may apply a weighting factor to each information in determining the priority for each of the robots.

Storage unit 120 is a component that stores instructions or programs that is used for the control unit 130 to perform control processes/operations with respect to the elevator. The storage unit 120 may store data used for various processes/processes executed by the control unit 130. Storage unit 120 may be implemented by using at least one of volatile memory or non-volatile memory.

The control unit 130 is a component that generally controls other components included in the control device 10 to control the operation of an elevator installed in a building. Further, the controller 130 may control movement of robots in the building.

Specifically, the control unit 130 controls the operation of the elevator on the basis of the priority of board-standby robots and priority of on-board robots. When the priority of the board-standby robots is higher than that of the on-board robots, the control unit 130 changes the destination floor of the elevator to the floor where the board-standby robots are waiting and moves the elevator to the floor on which the board-standby robots are located. Conversely, when the priority of the board-standby robots is lower than that of the on-board robots in the elevator, the control unit 130 moves the elevator to the destination floor of the on-board robot having the highest priority.

In accordance with an embodiment of the present disclosure, when the board-standby robots cannot board the elevator because of the on-board robots, the control unit 130 transmits an exit command to the on-board robots that have a lower priority than the board-standby robots via the communications unit 100. When the elevator car arrives at the floor on which a board-standby robot exists, the control unit 130 may transmit an exit command to the on-board robot having a lower priority than the board-standby robot if the board-standby robot cannot board the elevator due to the number of on-board robots or the lack of space. In order to detect a lack of space in the elevator, the control device 10 may further include an image collection unit. The image collection unit may be implemented with a camera in an elevator.

When the priority is adjusted according to the exit wait time of board-finished robots in accordance with an embodiment of the present disclosure, the control unit 130 controls the operation of the elevator according to the adjusted priority.

When the priority of board-finished robots in the elevator is adjusted according to the destination floor change request in accordance with an embodiment of the present disclosure, the control unit 130 controls the operation of the elevator in accordance with the adjusted priority.

In accordance with an embodiment of the present disclosure, the control unit 130 transmits a movement command to the board-finished robots via the communications unit 100 so that the locations of the board-finished robots in the elevator are arranged according to the target floor and priority of the board-finished robots. The control unit 130 arranges the higher-priority board-finished robots to be close to the entrance of the elevator. For the board-finished robots with the same priority, the control unit 130 arranges a board-finished robot having their destination floor close to the destination floor of the on-board robots with highest priority to be closer to the entrance door.

The control unit 130 may control the get-on and get-off of the board-standby robots and the on-board robots in the elevator according to the priority.

In accordance with an embodiment of the present disclosure, the control unit 130 may control a synchronization of robots. Specifically, the control unit 130 checks whether or not there exists a robot that is synchronized with a board-standby robot on the destination floor of the board-standby robot. When there exists a synchronized robot, the controller 130 sends a standby command to the synchronized robot to wait at the elevator entrance. As a result, the operation of moving the on-board robot to the elevator can be synchronized with the operation of moving the robot to the elevator. In addition, when the board-standby robot loads only a freight on the elevator, the synchronized robot can quickly carry the loaded freight when the elevator car arrives at its floor.

In accordance with another embodiment of the present disclosure, the control unit 130 may send a stop command to on-board robots when there is a collision between the on-board robots in the elevator car.

FIGS. 2A, 2B, 2C, 2D, and 2E are diagrams illustrating a method of controlling an elevator in accordance with an embodiment of the present disclosure.

Figure 2A:
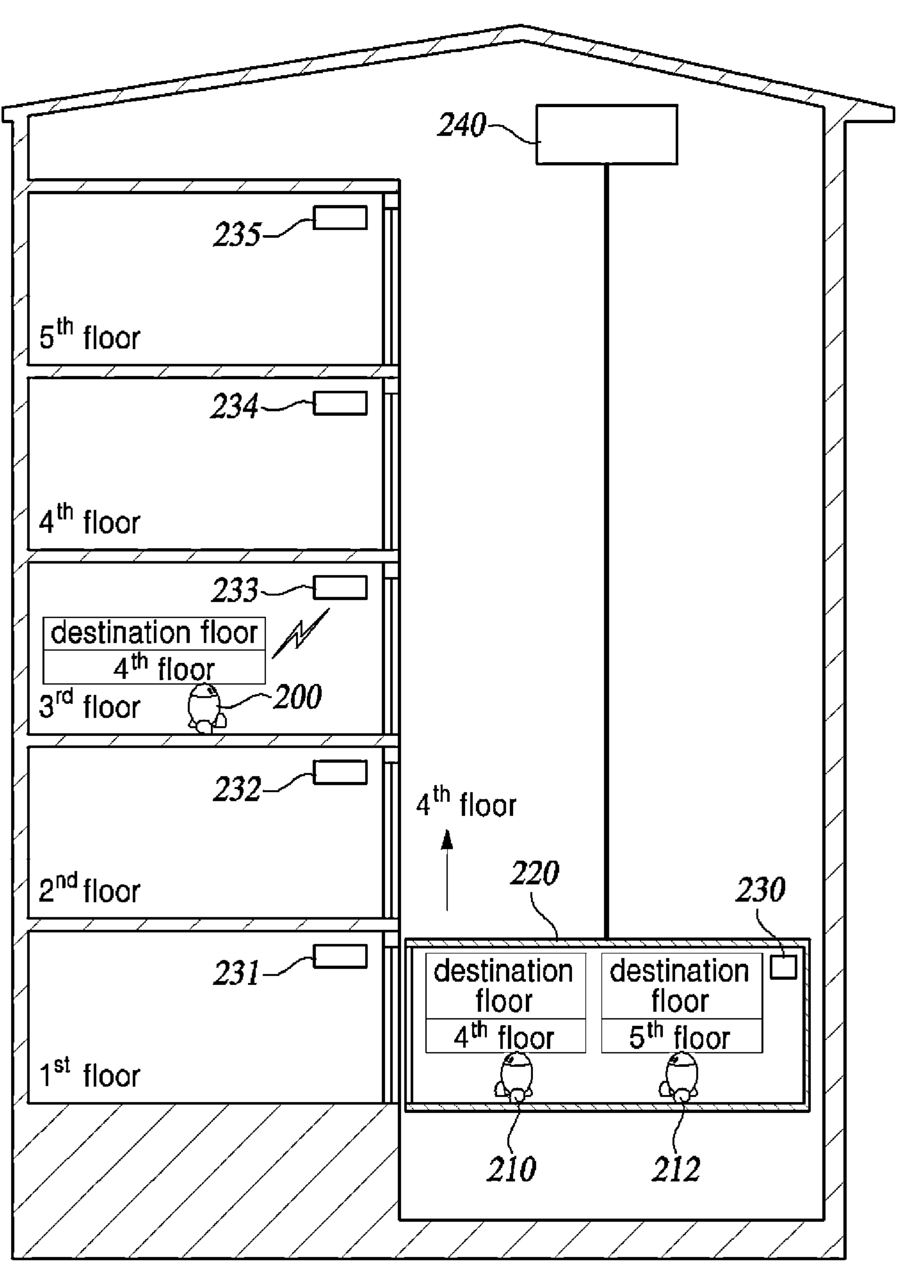
FIGS. 2A, 2B, 2C, 2D, and 2E are diagrams illustrating a method of controlling an elevator in accordance with an embodiment of the present disclosure.
Figure 2B:
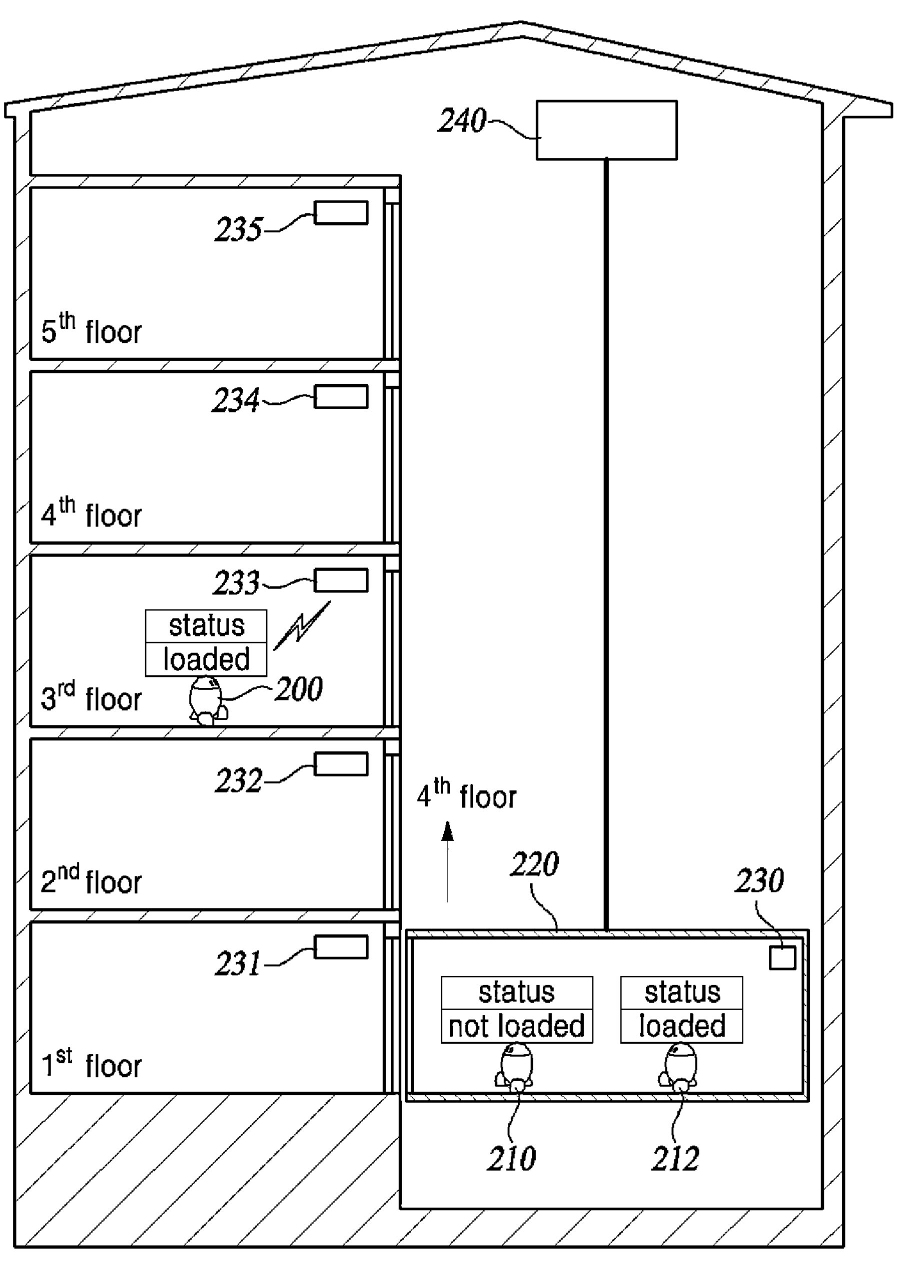
Figure 2C:
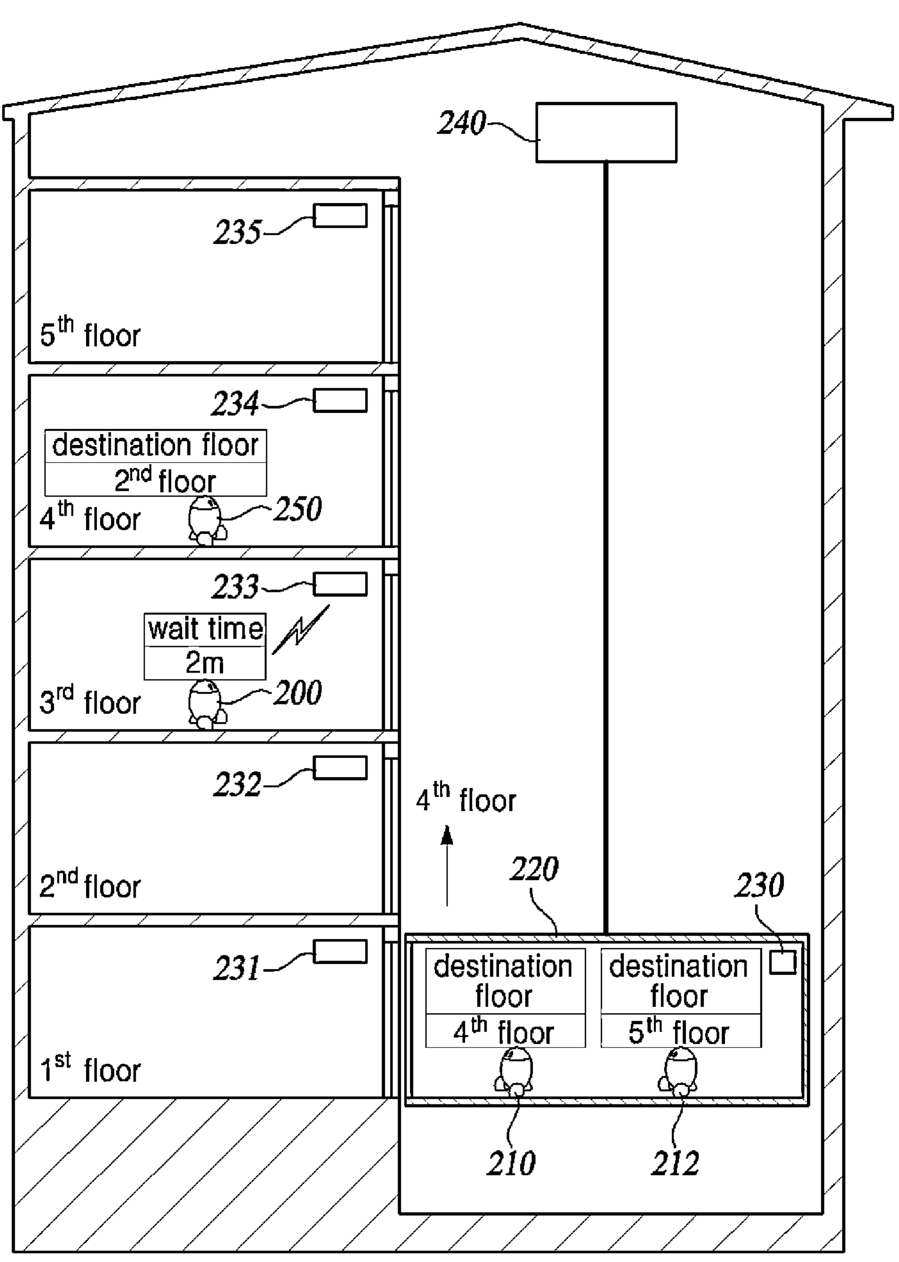

Referring to FIGS. 2A, 2B, 2C, 2D, and 2E, a board-standby robot 200, on-board robots 210, 212, elevator car 220, communication modules 230, 231, 232, 233, 234, 235, and a control panel 240 are shown. FIG. 2C further shows another board-standby robot 250.

A control device (not shown) in accordance with an embodiment of the present disclosure includes a control panel 240, communication modules 230, 231, 232, 233, 234, 235, and a priority determination unit (not shown). The control unit and the communications unit of the control device can be implemented with a control panel 240 and communication modules 230, 231, 232, 233, 234, 235. The communication modules 230, 231, 232, 233, 234, 235 include a zeroth communication module 230, a first communication module 231, a second communication module 232, a third communication module 233, a fourth communication module 234, and a fifth communication module 235.

The elevator car 220 is connected to a balance weight by a main rope and travels in the vertical direction by the winding machine controlled by the control panel 240.

The board-standby robot 200 transmits a board request to the third communication module 233. The board-standby robot 200 can transmit information on the board-standby robot 200 along with the board request. The information on the board-standby robot 200 includes a target floor information of the board-standby robot 200.

The control device determines the priority of the board-standby robot 200 by using the priority determination unit based on the information on the board-standby robot 200 and the travel information of the elevator car 220. Then, the control device controls the operation of the elevator car 220 based on the priority of the board-standby robot 200 and the priority of the on-board robots 210, 212 by using the control panel 240.

Referring to FIG. 2A, the elevator car 220 is moving toward fourth floor according to the priority of the first on-board robot 210. The control device may determine the priority of the board-standby robot 200 on the basis of the destination floor of the board-standby robot 200, and the destination floor of the elevator car 220.

Assuming that the target floor of the board-standby robot 200 is fourth and the target floor of the elevator car 220 is fourth, the control device can assign a high priority to the board-standby robot 200.

This can prevent the situation in which the priority of the second on-board robot 212 is higher than that of the board-standby robot 200 and the board-standby robot 200 cannot board the elevator car 220.

Referring to FIG. 2B, when the board-standby robot 200 is loaded with a freight, the control device may determine the priority of the board-standby robot 200 based on the type of the freight loaded on the board-standby robot 200. The control device can set the priority of the boarding robot to be high in a case where the boarding robot 200 is loaded with food or beverage. The priority according to the type of the freight may be preset by the supervisor.

When at least one of the on-board robot 210, the on-board robot 212, or the board-standby robot 200 is loaded with a freight, the priority of each board-standby robot 200 can be set based on information of each freight. When the board-standby robot 200 is loaded with a fire machine and the second on-board robot 212 is loaded with a flammable material, the control device can set the priority of the board-standby robot 200 to be low.

Referring to FIG. 2C, the control device may determine the priority based on the board-standby time of the board-standby robot 200. The control device moves the elevator car 220 to the fourth floor according to the priority of the first on-board robot 210. At the fourth floor, the first on-board robot 210 exits and another board-standby robot 250 gets on. Then, the control device moves the elevator car 220 to the third floor so as to carry the board-standby robot 200 if the wait time of the board-standby robot 200 becomes excessively delayed, even though the control device can move to the fifth floor in accordance with the priority of the second on-board robot 212.

In addition, the control device may determine the priority of the board-standby robot 200 based on the number of exit-standby robots having the floor of the on-board robots 210, 212 as the target floor among the on-board robots 210, 212.

Figure 2D:
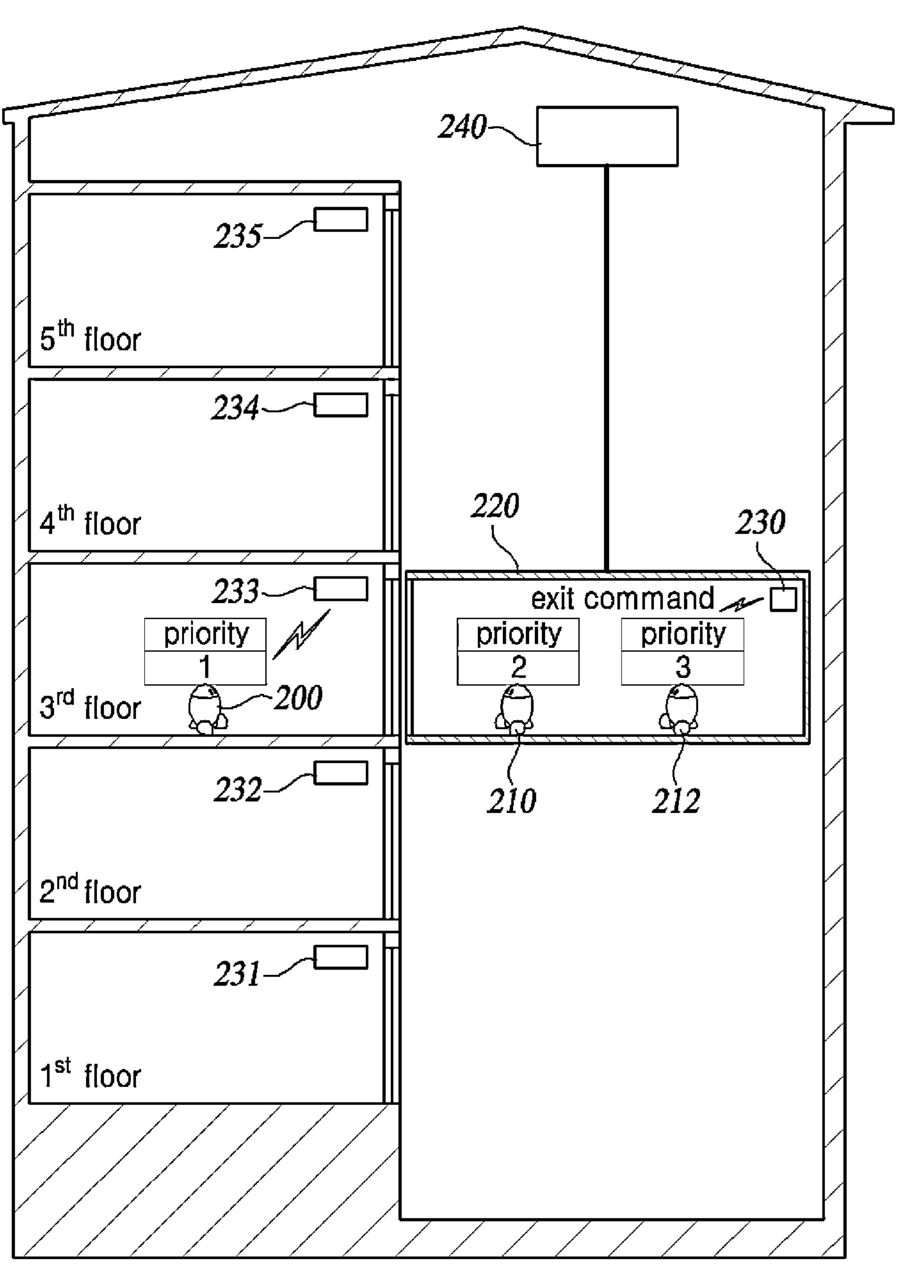

Referring to FIG. 2D, when board-standby robot 200 cannot get on the elevator car due to the on-board robots 210 and 212, the control device can transmit an exit command to an on-board robot, having a lower priority than the board-standby robot 200, of the on-board robots 210, 212. When the elevator car 220 arrives at the third floor where the board-standby robot 200, which has the highest priority, is waiting, but when the board-standby robot 200 cannot get on due to the large number of on-board robots 210, 212 or lack of space in the elevator car 220, the control device sends an exit command to the on-board robots 210, 212 via the zeroth communication module 230. The control device can transmit an exit command in a range necessary for ensuring boarding of the board-standby robot 200. In other words, the exit command can be transmitted only to the second on-board robot 212, which has the lowest priority.

Figure 2E:
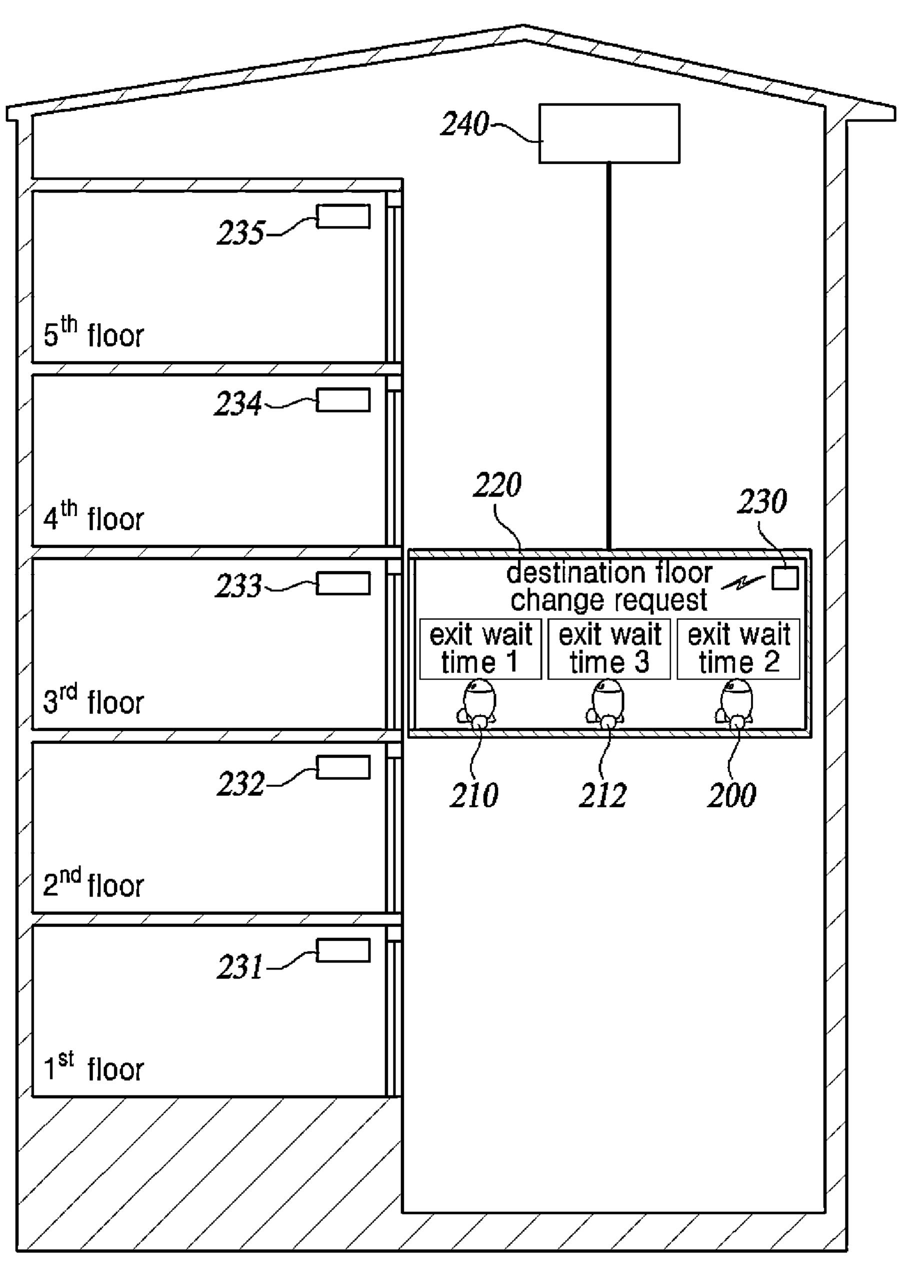

Referring to FIG. 2E, the control device may adjust the priority based on the exit wait time of the board-finished robots 200, 210, 212 in the elevator car 220 and control the travel of the elevator car 220 according to the adjusted priority. Even if the board-standby robot 200 has the highest priority at the time of boarding, the control device may control the elevator car 220 to raise the priority of the second on-board robot 212 as the exit wait time increases and to exit first.

In addition, the control device may receive the destination floor change request from at least one of the board-finished robots 200, 210, 212 via the zeroth communication module 230, adjust the priority, and adjust control of the travel of the elevator car 220.

Figure 3:
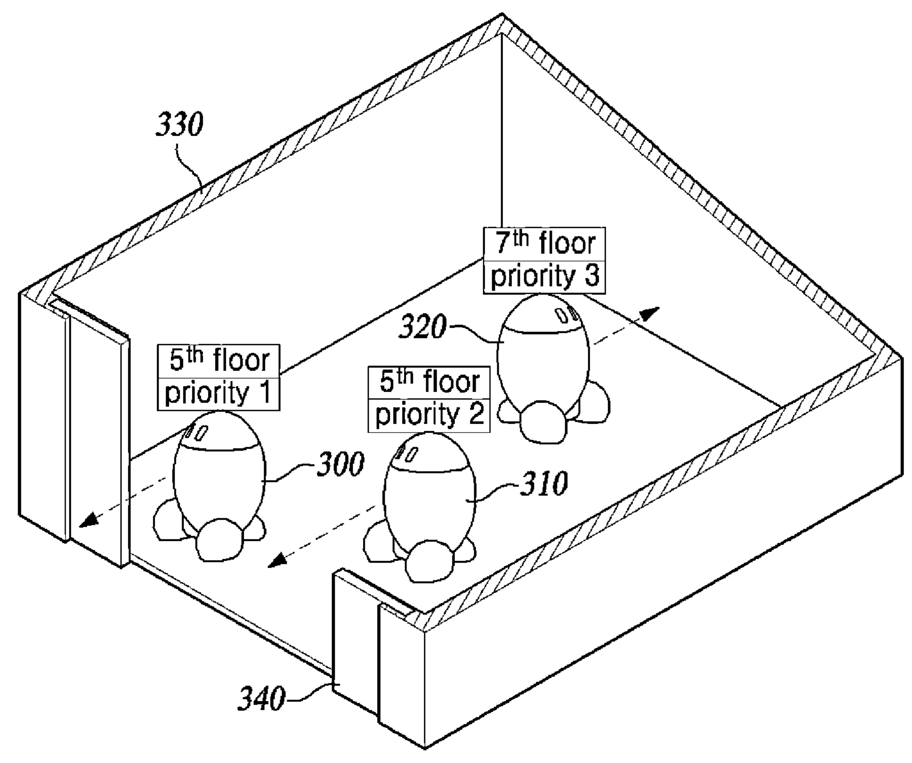
FIG. 3 is a diagram illustrating an elevator control method in accordance with an embodiment of the present disclosure.

FIG. 3 is a diagram illustrating an elevator control method in accordance with an embodiment of the present disclosure.

Referring to FIG. 3, there are shown a first on-board robot 300, a second on-board robot 310, a third on-board robot 320, an elevator 330, and a door 340.

The control device (not shown) may control the movement of each of the robots according to the target floor and priority of the first on-board robot 300, the second on-board robots 310, and the third on-board robots 320. The control device transmits movement commands via the communication module.

The control device moves the first on-board robot 300 having a high priority to the position closest to the door 340 and moves the third on-board robot 320 having a low priority to the position farthest from the door 340. If there are more on-board robots with the same priority, the control device arranges the on-board robots having the destination floor close to the fifth floor, which is the destination floor of the first on-board robot 300, closer to the door 340 side among the board-finished robots with the same priority.

Figure 4:
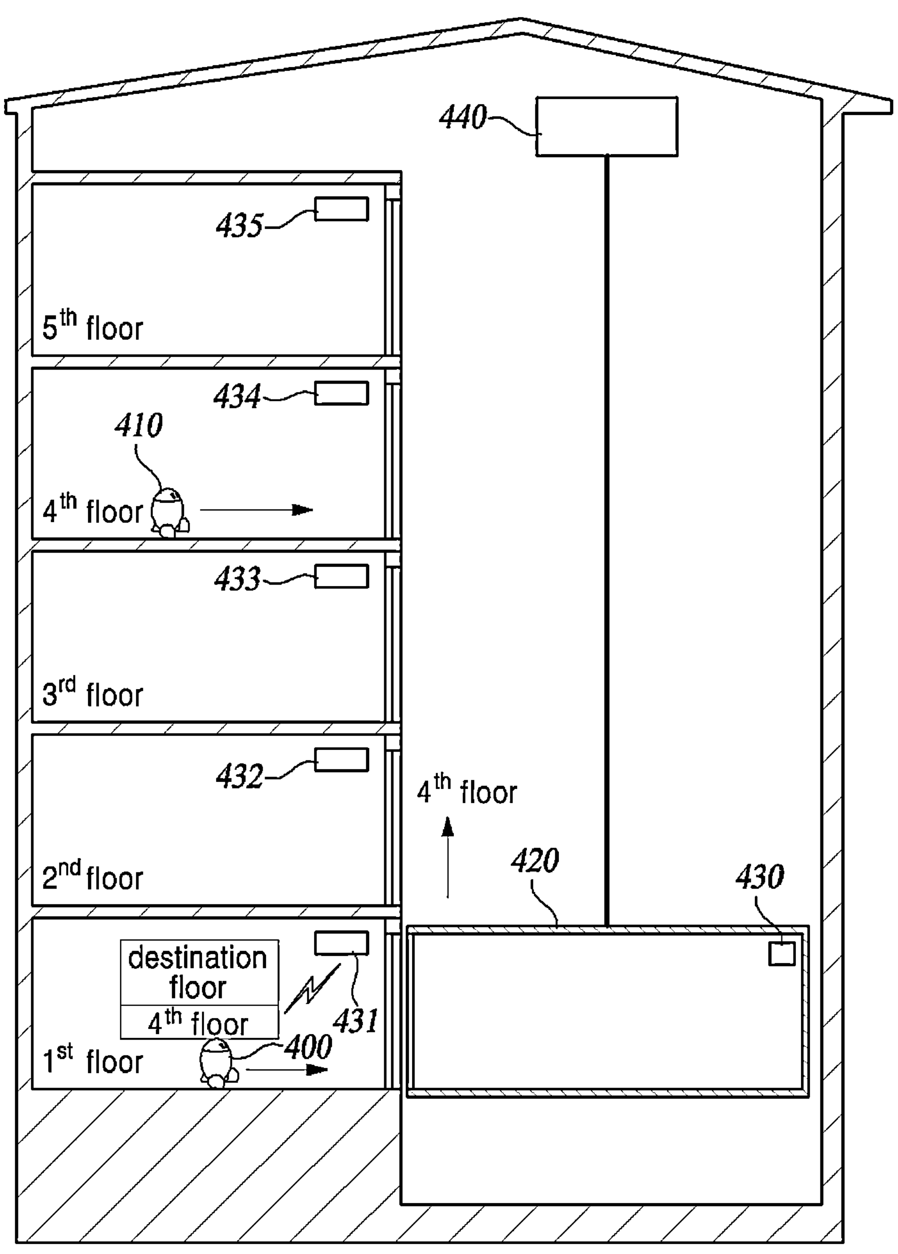
FIG. 4 is a diagram illustrating a robot synchronization control method in accordance with one embodiment of the present disclosure.

FIG. 4 is a diagram illustrating a robot synchronization control method in accordance with an embodiment of the present disclosure.

FIG. 4 illustrates a board-standby robot 400, a synchronized robot 410, an elevator 420, communication modules 430, 431, 432, 433, 434, 435, and a control panel 440.

The control device can control the synchronized robot 410 at the destination floor of the board-standby robot 400. Specifically, the control device checks whether there is a robot 410 synchronized with the board-standby robot 400 on the destination floor of the board-standby robot 400. When there is a synchronized robot 410, the control device sends a standby command to the synchronized robot 410 to wait at the elevator entrance. As a result, the operation of moving the synchronized robot 410 to the elevator and moving the on-board robot 400 to the elevator can be synchronized. In addition, when the board-standby robot 400 loads only freight on the elevator, the synchronized robot 410 can quickly carry the loaded freight when the elevator arrives at its floor.

Figure 5:
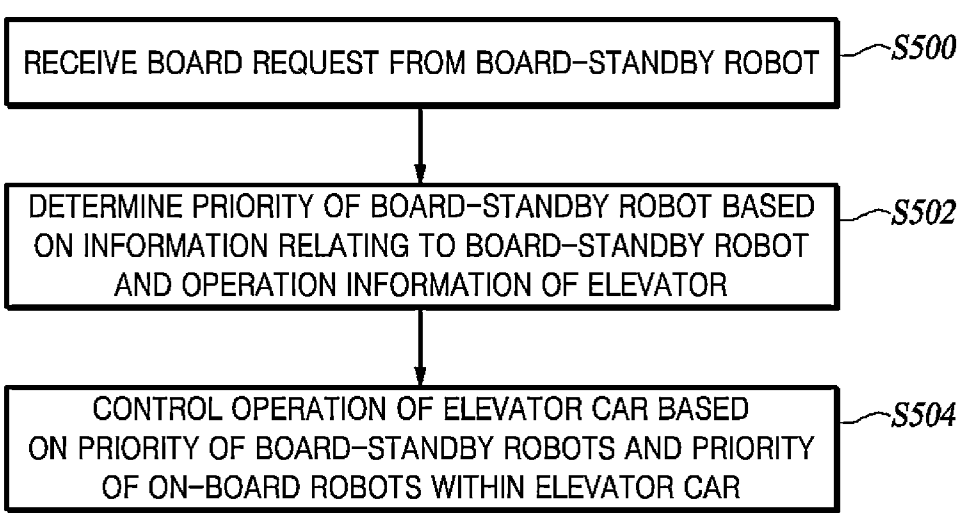
FIG. 5 is a flowchart for explaining a method of controlling an elevator in accordance with an embodiment of the present disclosure.

FIG. 5 is a flowchart for explaining a method of controlling an elevator in accordance with an embodiment of the present disclosure.

Referring to FIG. 5, the control device receives a board request from the board-standby robot (S500). Here, the control device can further receive the target floor information, the current position, and the information on the loaded freight, which are the information on the board-standby robot.

The control device determines the priority of the board-standby robot on the basis of the information on the board-standby robot and the operation information of the elevator (S502).

In accordance with an embodiment of the present disclosure, the control device determines the priority of the board-standby robot on the basis of the destination floor of the board-standby robot and the destination floor of the elevator car.

In accordance with an embodiment of the present disclosure, the control device determines the priority of the board-standby robot on the basis of the type of a freight loaded on the board-standby robot, in case when the board-standby robot is loaded with the freight.

In accordance with an embodiment of the present disclosure, the control device determines a priority of the board-standby robot based on a board wait time of the board-standby robot.

In accordance with an embodiment of the present disclosure, when it is determined that at least one of the on-board robots or the board-standby robot is loaded with a freight, the control device determines the priority of the board-standby robot based on the freight information of the at least one of the on-board robots or the board-standby robot.

In accordance with an embodiment of the present disclosure, the control device determines the priority of the board-standby robots based on the number of exit-standby robots having, as a target floor, the floor on which the board-standby robots are located.

The control device controls the operation of the elevator on the basis of the priority of the board-standby robot and the priority of on-board robots (S504).

If the priority of the boarding robot is higher than that of the on-board robots, the control device changes the destination floor of the elevator to the floor on which the board-standby robot is located and moves the elevator car to the floor where the board-standby robot is located. Conversely, if the priority of the board-standby robot is lower than that of the on-board robots, then the control device moves the elevator car to the destination floor of one of the on-board robots having the highest priority.

In accordance with an embodiment of the present disclosure, the control device transmits an exit command to a low-priority on-board robot between or among the on-board robots, which has a lower priority than the on-board robot, when the on-board robots cannot board due to the on-board robots.

In accordance with an embodiment of the present disclosure, the control device may send a movement command to one of the on-board robots such that the location of the board-finished robots is arranged according to the destination floor and the priority of the board-finished robots.

In accordance with an embodiment of the present disclosure, the control device can check the boarding of the board-standby robots. Then, the control device may adjust the priority and control the operation of the elevator according to the adjusted priority, based on the reception of the destination floor change request from at least one of the board-finished robots or the exit wait time of the board-finished robots.

Figure 6:
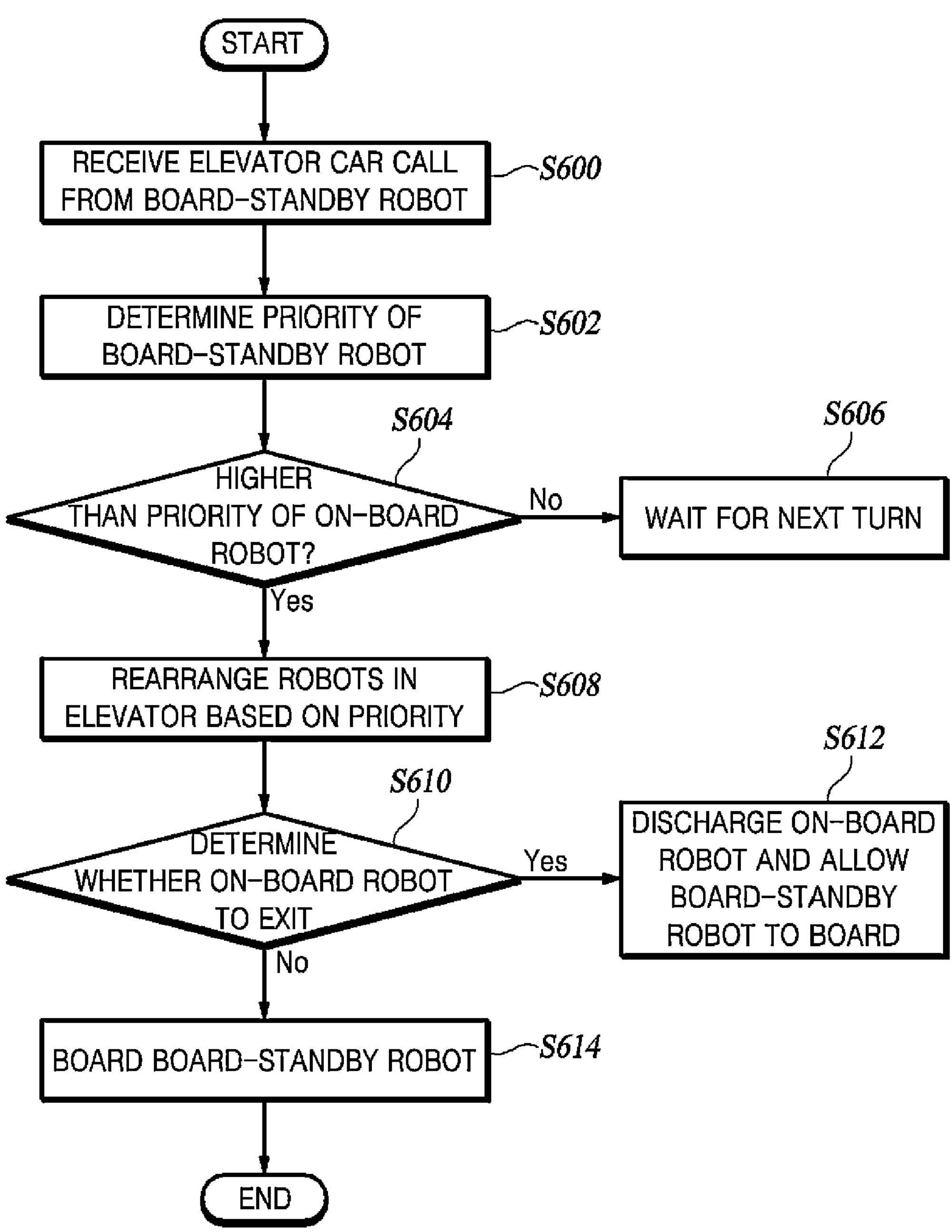
FIG. 6 is a flowchart for describing an elevator control method in accordance with an embodiment of the present disclosure.

FIG. 6 is a flowchart for describing an elevator control method in accordance with an embodiment of the present disclosure.

Referring to FIG. 6, first, the board-standby robot calls the elevator car (S600). The board-standby robot transmits a board request.

The control device determines the priority of the boarding robot in response to the board request (S602).

The control device checks whether the priority of the board-standby robot is higher than that of the on-board robot (S604).

When the priority of the board-standby robot is lower than that of the on-board robot (No in S604), the control device instructs board-standby robot to wait for the next turn (S606).

If the priority of the boarding robot is higher in priority (Yes in S604), the control device may rearrange the robots in the elevator based on the priority (S608). The control device can arrange the robots to be closer to the elevator entrance side according to the priority.

Here, the control device determines whether any on-board robot needs to exit (S610). It is done because such an exit-standby robot may be placed in the further inside from the entrance of the elevator.

When an exit of the on-board robot is not necessary (No in S610), the control device boards the board-standby robot (S614). A position rearrangement of robots within the elevator car is then performed.

When an exit of an on-board robot is necessary (Yes in S610), the control device discharges the on-board robot and allows the board-standby robot to board (S612). The control device secures a space within the elevator car by discharging an on-board robot. An on-board robot boards the elevator, performs a position rearrangement within the elevator car and charges the exit robot back on the car.

The above processes may be performed through command transmissions by the control device.

Meanwhile, the operations illustrated in FIG. 5, as well as the operations illustrated in FIG. 6, can be implemented as computer-readable codes on a computer-readable recording medium. The computer readable recording medium may include all kinds of recording apparatuses in which data that may be read by a computer system is stored. In other words, the computer-readable recording medium may be a non-transitory medium, such as a read-only memory (ROM), a random-access memory (RAM), a compact disc (CD)-ROM, a magnetic tape, a floppy disk, and an optical data storage device. The computer-readable recording medium may further include a transitory medium, such as a carrier wave (for example, transmission over the Internet) and a data transmission medium. In addition, the computer readable recording media may be distributed in computer systems connected to each other through a network such that the computer readable codes may be stored and executed in the computer readable recording media in a distributed scheme.

In addition, components of the present disclosure may use an integrated circuit structure, such as a memory, a processor, a logic circuit, a look-up table, and the like. These integrated circuit structures execute each of the functions described herein through the control of one or more microprocessors or other control devices. In addition, components of the present disclosure may be specifically implemented by a program or a portion of a code that includes one or more executable instructions for performing a specific logical function and is executed by one or more microprocessors or other control devices. In addition, components of the present disclosure may include or be implemented as a Central Processing Unit (CPU), a microprocessor, or the like that perform respective functions. In addition, components of the present disclosure may store instructions executed by one or more processors in one or more memories.

Although embodiments of the present disclosure have been described for illustrative purposes, those having ordinary skill in the art should appreciate that various modifications, additions, and substitutions are possible, without departing from the idea and scope of the present disclosure. Therefore, embodiments of the present disclosure have been described for the sake of brevity and clarity. The scope of the technical idea of the present embodiments is not limited by the illustrations. Accordingly, those having ordinary skill should understand the scope of the present disclosure is not to be limited by the above explicitly described embodiments but by the claims and equivalents thereof.

As described above, according to an embodiment of the present disclosure, it is possible to reduce the time taken for the robot to reach the destination floor and to improve the operation efficiency of the elevator, by determining a priority for board-standby robots and on-board robots and controlling the elevator operation according to the priority.

According to another embodiment of the present disclosure, when robots are loaded with freight, it is possible to improve the efficiency of the transportation service and ensure safety by determining the priority of the robots in consideration of the loaded freight.

According to another embodiment of the present disclosure, by determining the priority of robots in consideration of the board-standby time of board-standby robots and the exit-standby time of on-board robots, it is possible to prevent excessive delay in boarding and exiting of robots by causing robots having a low initial priority to board over time in preference to other robots.

According to another embodiment of the present disclosure, by controlling the movement of robots according to the priority of robots, it is possible to mitigate the congestion of robots and to improve the travel efficiency of the elevator.

| Reference Numerals | |
|---|---|
| 100 communication unit | 110 priority determination unit |
| 120 storage unit | 130 control unit |

What is claimed is:

1. An elevator control method, which is implemented by a computer, comprising:

receiving a board request from a board-standby robot;

determining a priority of the board-standby robot based on information relating to the board-standby robot and operation information of an elevator;

controlling operation of an elevator car based on the priority of board-standby robots and the priority of on-board robots within the elevator car;

confirming a boarding of the board-standby robot;

adjusting a priority of board-finished robots based on a wait time of the board-finished robots in the elevator; and controlling operation of the elevator according to the adjusted priority.

2. The elevator control method according to claim 1, wherein the determining the priority of the board-standby robot comprises: determining the priority of the board-standby robot based on a destination floor of the board-standby robot and a destination of the elevator car.

3. The elevator control method according to claim 1, wherein the determining the priority of the board-standby robot comprises: in a case where the board-standby robot is loaded with a freight, determining the priority of the board-standby robot based on a type of a freight loaded in the board-standby robot.

4. The elevator control method according to claim 1, wherein the determining the priority of the board-standby robot comprises: determining, in a case where at least one of the on-board robots is carrying a freight and the board-standby robot is carrying a freight, the priority for the board-standby robot based on freight information of the at least one of the on-board robots and the freight information of the board-standby robot.

5. The elevator control method according to claim 1, wherein the determining the priority of the board-standby robot comprises: determining the priority of the board-standby robot based on a board standby time of the board-standby robot.

6. The elevator control method according to claim 1, wherein the determining the priority of the board-standby robot comprises: determining the priority of the board-standby robot based on the number of exit-standby robots among the on-board robots, wherein the exit-standby robots have, as a destination floor, a floor on which the board-standby robot is located.

7. The elevator control method according to claim 1, further comprising: transmitting an exit command to one of the on-board robots that have a priority lower than that of the board-standby robot, if the board-standby robot is unable to board due to the on-board robots.

8. The elevator control method according to claim 1, further comprising:

receiving a destination floor change request from at least one of board-finished robots in the elevator; and adjusting the priority of the board-finished robots according to the destination floor change request.

9. The elevator control method according to claim 1, further comprising:

transmitting a movement command to board-finished robots so that a position of the board-finished robots in the elevator is re-positioned according to a destination floor and a priority of the board-finished robots.

10. The elevator control method according to claim 1, further comprising:

checking whether there exists a robot synchronized with the board-standby robot at a destination floor of the board-standby robot; and sending a wait command to the synchronized robot to wait at an elevator entrance when there exists the synchronized robot.

11. The elevator control method according to claim 1, wherein determining the priority of the board-standby robot comprises: determining the priority based on whether a user is on-board on any of the on-board robots and whether a user is on-board on the board-standby robot.

12. An elevator control device, comprising:

a communication unit for receiving a board request from a board-standby robot;

a priority determination unit for determining a priority of the board-standby robot based on information relating to the board-standby robot and operation information of an elevator; and a control unit for controlling operation of an elevator car based on the priority of the board-standby robot and the priority of on-board robots and for confirming a boarding of the board-standby robot, wherein the priority determination unit adjusts a priority of board-finished robots based on an exit wait time of the board-finished robots in the elevator; and the control unit controls operation of the elevator according to the adjusted priority.

13. The elevator control device according to claim 12, wherein the priority determination unit determines the priority of the board-standby robot based on a destination floor of the board-standby robot and a destination floor of the elevator car.

14. The elevator control device according to claim 12, wherein the priority determination unit determines the priority of the board-standby robot based on a type of a freight loaded on the board-standby robot, in a case where the board-standby robot is loaded with the freight.

15. The elevator control device according to claim 12, wherein the priority determination unit determines the priority of the board-standby robot based on freight information of the at least one of the on-board robots and the freight information of the board-standby robot, in a case where at least one of the on-board robots is carrying a freight and the board-standby robot is carrying a freight.

16. The elevator control device according to claim 12, wherein the priority determination unit determines the priority of the board-standby robot based on a board-standby time of the board-standby robot.

17. The elevator control device according to claim 12, wherein the priority determination unit determines the priority of the board-standby robot based on the number of exit-standby robots among the on-board robots, wherein the exit-standby robots have, as a destination floor, a floor on which the board-standby robot is located.

18. The elevator control device according to claim 12, wherein the control unit transmits an exit command to one of the on-board robots that have a priority lower than that of the board-standby robot, if the board-standby robot is unable to board due to the on-board robots.

19. The elevator control device according to claim 12, wherein, when the communication unit receives a destination floor change request from at least one of board-finished robots in the elevator, the priority determination unit controls operation of the elevator according to an adjusted priority.

20. The elevator control device according to claim 12, wherein the control unit transmits a movement command to board-finished robots so that a position of the board-finished robots in the elevator is re-positioned according to a destination floor and a priority of the board-finished robots.

21. The elevator control device according to claim 12, wherein the control unit checks whether there exists a robot synchronized with the board-standby robot at a destination floor of the board-standby robot, and sends a wait command to the synchronized robot to wait at an elevator entrance when there exists the synchronized robot.

22. The elevator control device according to claim 12, wherein the priority determination unit determines the priority based on whether a user is on-board on any of the on-board robots and whether a user is on-board on the board-standby robot.

* * * * *